(12) United States Patent
Reynolds

(10) Patent No.: US 9,995,472 B2
(45) Date of Patent: Jun. 12, 2018

(54) ARC MODULAR LED LIGHT FIXTURE

(71) Applicant: Robert Reynolds, Sarasota, FL (US)

(72) Inventor: Robert Reynolds, Sarasota, FL (US)

(73) Assignee: ABL Research Group, LLC, Sarasota, FL (US)

( * ) Notice: Subject to any disclaimer, the term of this patent is extended or adjusted under 35 U.S.C. 154(b) by 537 days.

(21) Appl. No.: 14/337,005

(22) Filed: Jul. 21, 2014

(65) Prior Publication Data

US 2015/0029716 A1   Jan. 29, 2015

Related U.S. Application Data

(60) Provisional application No. 61/858,460, filed on Jul. 25, 2013.

(51) Int. Cl.
| | |
|---|---|
| *F21V 29/00* | (2015.01) |
| *F21S 2/00* | (2016.01) |
| *F21V 29/67* | (2015.01) |
| *A01G 7/04* | (2006.01) |
| *F21V 29/74* | (2015.01) |
| *F21K 9/20* | (2016.01) |
| *F21K 9/69* | (2016.01) |
| *F21Y 103/10* | (2016.01) |
| *F21Y 115/10* | (2016.01) |
| *F21Y 107/10* | (2016.01) |

(52) U.S. Cl.
CPC .......... *F21V 29/2206* (2013.01); *A01G 7/045* (2013.01); *F21K 9/20* (2016.08); *F21K 9/69* (2016.08); *F21S 2/00* (2013.01); *F21V 29/67* (2015.01); *F21V 29/74* (2015.01); *F21Y 2103/10* (2016.08); *F21Y 2107/10* (2016.08); *F21Y 2115/10* (2016.08); *Y02P 60/149* (2015.11)

(58) Field of Classification Search
CPC ............... F21Y 2111/005; F21Y 2003/003; F21K 9/30; F21S 2/00
USPC ...................................... 362/249.02
See application file for complete search history.

(56) References Cited

U.S. PATENT DOCUMENTS

| | | | | |
|---|---|---|---|---|
| 7,226,185 B2 * | 6/2007 | Dolgin | ..................... | G02B 3/00 362/239 |
| 8,047,680 B2 * | 11/2011 | Huang | .................. | F21V 19/003 362/218 |
| 8,061,869 B2 * | 11/2011 | Lo | ........................... | F21S 2/005 362/218 |

(Continued)

OTHER PUBLICATIONS

KR 10-2012-0146526, publication. International filing of 2014/0168991 reference.*

*Primary Examiner* — Anabel Ton
(74) *Attorney, Agent, or Firm* — Reichel Stohry LLP; Mark C. Reichel; Natalie J. Dean

(57) ABSTRACT

A modular lighting fixture includes a housing having a front panel, the front panel having a radius of curvature, and a plurality of LED modules disposed adjacent the front panel, each LED module having a heat sink, an LED source mounted to the heat sink, and a lens disposed over the LED source, the lens capable of refracting light emitted by the LED source into a desired distribution pattern. The plurality of LED modules produce a concentrated illuminated area at a pre-determined distance from the front panel as determined by the radius of curvature of the front panel.

22 Claims, 5 Drawing Sheets

(56) References Cited

U.S. PATENT DOCUMENTS

| | | | | |
|---|---|---|---|---|
| 8,317,363 | B2* | 11/2012 | Zheng | F21V 29/76 |
| | | | | 362/231 |
| 8,434,899 | B2* | 5/2013 | Lee | F21S 2/005 |
| | | | | 362/249.02 |
| 8,979,303 | B2* | 3/2015 | Adams | F21S 48/321 |
| | | | | 362/235 |
| 9,470,378 | B2* | 10/2016 | Kim | F21V 15/013 |
| 2005/0068777 | A1* | 3/2005 | Popovic | B60Q 1/2611 |
| | | | | 362/307 |
| 2010/0118534 | A1* | 5/2010 | Lo | F21S 2/005 |
| | | | | 362/249.02 |
| 2010/0321952 | A1* | 12/2010 | Coleman | F21S 8/04 |
| | | | | 362/607 |
| 2012/0206918 | A1* | 8/2012 | Lee | F21S 2/005 |
| | | | | 362/249.02 |
| 2014/0078762 | A1* | 3/2014 | Adams | F21S 48/1104 |
| | | | | 362/496 |
| 2014/0168991 | A1* | 6/2014 | Kim | F21V 15/013 |
| | | | | 362/297 |
| 2015/0247612 | A1* | 9/2015 | Zhang | F21K 9/56 |
| | | | | 362/293 |

* cited by examiner

ARC MODULAR LED LIGHT FIXTURE

CROSS-REFERENCE TO RELATED APPLICATION

This application claims the benefit of U.S. Provisional Application No. 61/858,460, filed Jul. 25, 2013.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

TECHNICAL FIELD

Embodiments disclosed herein relate generally to light fixtures, and in particular to LED light fixtures.

BACKGROUND ART

Recent decades have seen an accelerating shift toward the use of light-emitting diodes (LEDs) in light fixtures. Compared to other forms of electrical light, such as fluorescent and incandescent lighting, LEDs are extremely energy efficient, reducing electrical bills and reducing the environmental impact of energy used for lighting. LEDs also have much longer useful lifespans than most other forms of electrical lighting, especially when compared to lighting suitable for indoor use. In the past LEDs also had certain disadvantages, such as the tendency to emit light in narrow ranges of wavelengths, often seeming monochromatic, and difficulty matching the luminous power of incandescent and fluorescent lights. As the use of LEDs has expanded, firms across the globe have raced to improve LEDs, shoring up many of their traditional weaknesses. LEDs that produce more lumens and LEDs that produce broader spectra of light have become increasingly ubiquitous and inexpensive. Nonetheless, where a high luminous output, a broad spectrum of wavelengths, or both are desired, LEDs still cannot match competing technologies. For instance, indoor horticulture using artificial light requires high-intensity light with a broad range of wavelengths as a substitute for the sunlight plants naturally crave. Currently available LED fixtures often fail to achieve those requirements, forcing indoor horticulturalists to select less energy-efficient options.

SUMMARY OF THE EMBODIMENTS

According to one aspect, a modular lighting fixture includes a housing having a front panel, the front panel having a radius of curvature, and a plurality of LED modules disposed adjacent the front panel. Each of the LED modules includes a heat sink, an LED source mounted to the heat sink, and a lens disposed over the LED source, the lens capable of refracting light emitted by the LED source into a desired distribution pattern. The plurality of LED modules produce a concentrated illuminated area at a pre-determined distance from the front panel as determined by the radius of curvature of the front panel. The heat sink of each LED module may have an internal volume defined by a closed end, a sidewall, and an open end, and the LED source may be mounted within the volume and positioned to emit light toward the open end.

In an additional aspect, the LED source of at least one of the plurality of LED modules further includes at least one light-emitting diode configured to emit red light, at least one light-emitting diode configured to emit orange light, and at least one light-emitting diode configured to emit blue light. In another aspect, the LED source of at least one of the plurality of LED modules further includes at least one light-emitting diode configured to emit red light, at least one light-emitting diode configured to emit green light, and at least one light-emitting diode configured to emit blue light. The LED source of at least one of the plurality of LED modules may also include at least one light-emitting diode configured to emit broad-spectrum white light. At least one of the plurality of LED modules may include a color mixing lens disposed between the LED source and collimating lens; the collimating lens may be a color-mixing lens. The lens may be removably attached to the heat sink, so that different lenses may be substituted within the LED module. The fixture includes four LED modules in one embodiment.

In an additional aspect, the fixture further includes at least one controller to regulate the voltage and current supplied to the LED sources in the plurality of LED modules. The at least one controller may be a controller incorporated in each LED module. The fixture may include a dimmer switch configured to permit the user to adjust the intensity of light emitted from at least one LED module. The fixture may also include at least one cooling fan positioned to force ambient air across the heat sinks of the plurality of LED modules; the at least one cooling fan may be a cooling fan incorporated in each LED module. The fixture may include a means of adjusting an angle of aim of a specific LED module relative to the front panel.

In another aspect, a lighting fixture includes a plurality of modular units, each modular unit including a front panel, the front panel having a radius of curvature and a plurality of LED modules disposed within the housing adjacent the front panel. Each LED module comprises a heat sink, an LED source mounted to the heat sink, and a lens disposed over the LED source, the lens capable of refracting light emitted by the LED source into a desired distribution pattern, wherein the plurality of LED modules produce a concentrated illuminated area at a pre-determined distance from the front panel as determined by the radius of curvature of the front panel. The plurality of modular units may be removably attached to one another to form an array of LED modules. All of the modular units may be arranged to converge their respective emitted light distribution patterns around the same illuminated area. The fixture may also include a means of adjusting the position and attitude of one modular unit relative to another. Each modular unit may have a power interconnect enabling the plurality of modular units to be electrically connected.

Other aspects, embodiments and features of the light fixture will become apparent from the following detailed description when considered in conjunction with the accompanying figures. The accompanying figures are for schematic purposes and are not intended to be drawn to scale. In the figures, each identical or substantially similar component that is illustrated in various figures is represented by a single numeral or notation. For purposes of clarity, not every component is labeled in every figure. Nor is every component of each embodiment of the system and method shown where illustration is not necessary to allow those of ordinary skill in the art to understand the light fixture.

BRIEF DESCRIPTION OF THE DRAWINGS

The preceding summary, as well as the following detailed description of the invention, will be better understood when read in conjunction with the attached drawings. For the purpose of illustrating the invention, presently preferred embodiments are shown in the drawings. It should be understood, however, that the invention is not limited to the precise arrangements and instrumentalities shown.

DETAILED DESCRIPTION OF SPECIFIC EMBODIMENTS

Figure 1:
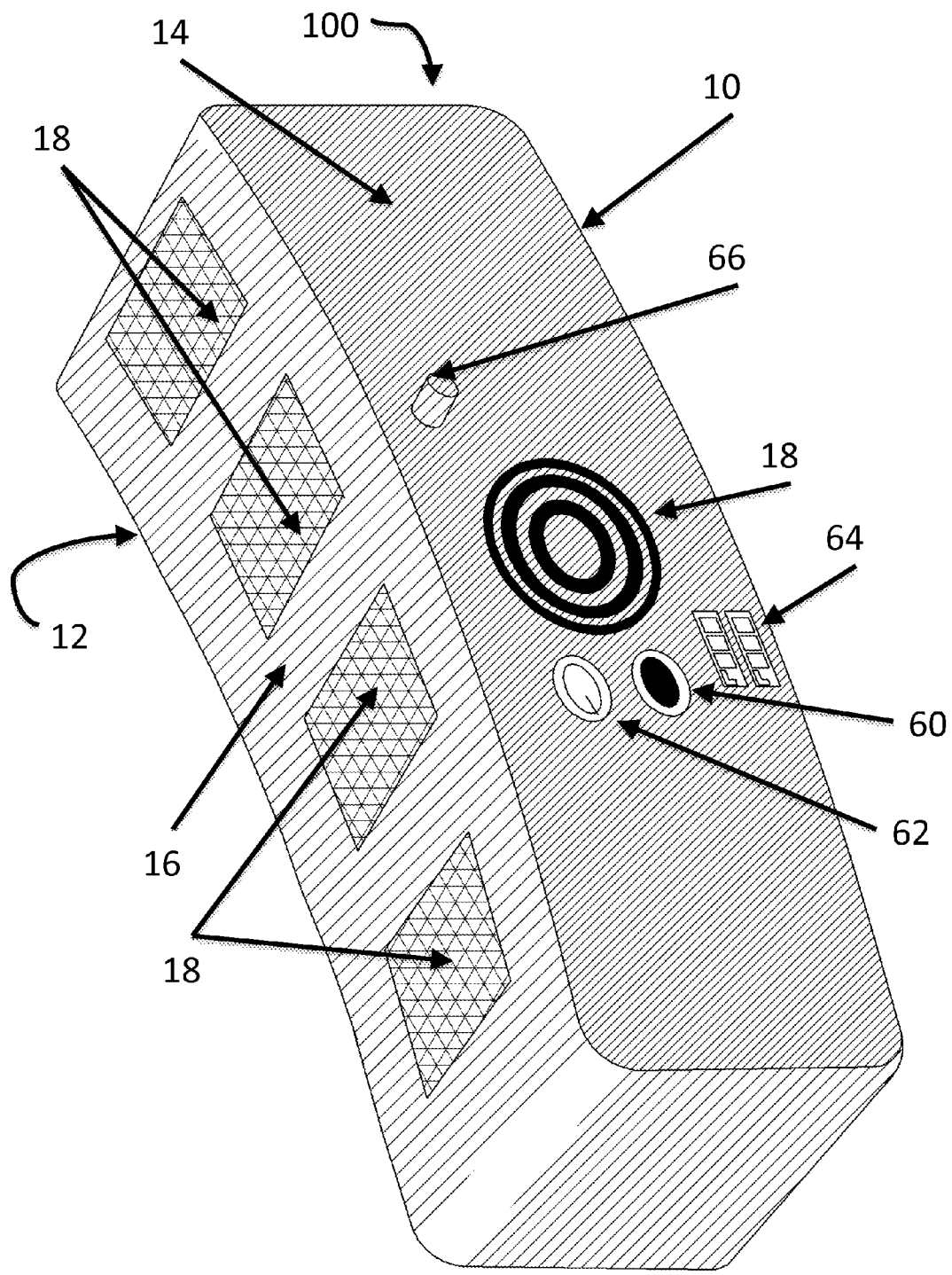
FIG. 1 shows an isometric view of an embodiment of an arc modular LED light fixture according to the present disclosure.

The present application discloses various embodiments of an arc-shaped modular light emitting diode ("LED") light fixture and methods for using and constructing the same. According to one aspect of the present disclosure, an arc modular fixture array having a plurality of LED modules, suitable for horticulture, aquaculture, and general area light is disclosed. For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 shows an arc modular LED light fixture 100 according to at least one embodiment of the present disclosure. As shown in FIG. 1, the fixture 100 may include a housing 10 having a back panel 14 and a front panel 12 joined together by one or more side panels 16. The front panel 12 may have a curved or arced shape in profile that defines a substantially uniform radius of curvature between the side panels 16. The back panel 14 may be similarly arced in profile, though the radius of the back panel 14 need not be identical to the radius of the front panel 12. In some embodiments, the back panel 14 may be substantially flat. The housing 10 may include one or more vents 18 formed therethrough to enable the flow of ambient air into, through, and out of the housing 10.

Figure 2:
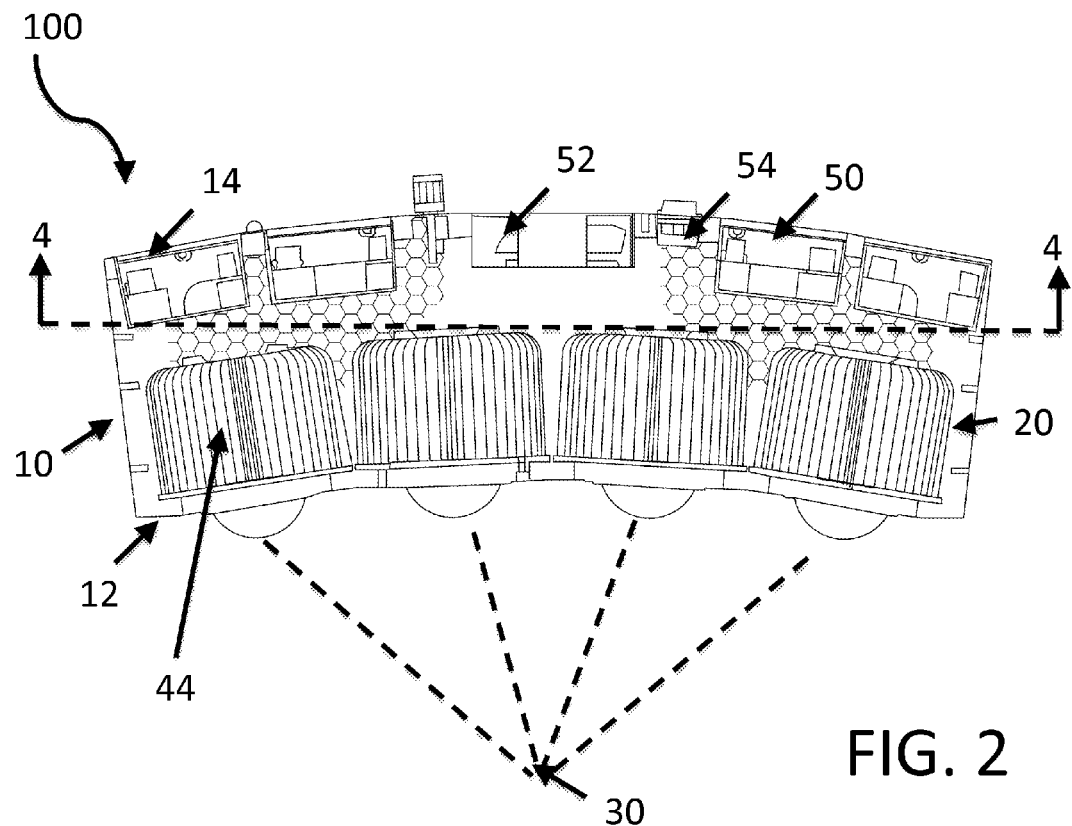
FIG. 2 shows a cut-away plan view of an embodiment of an arc modular LED light fixture according to the present disclosure.

FIG. 2 shows a cut-away plan view of the fixture according to the present disclosure. As shown in FIG. 2, the fixture 100 may include a plurality of LED modules 20 disposed within the housing 10 and mounted adjacent the front panel 12. Each LED module 20 is capable of generating or emitting a pre-determined light distribution pattern as described further herein. The plurality of LED modules 20 may be disposed adjacent the front panel 12 such that each LED module 20 is aimed or directed toward the same central point 3—of the radius of curvature of the front panel 12. In such an embodiment, the plurality of LED modules 20 may be arranged to converge their respective emitted light distribution patterns around the same center point 30, thereby generating a single, fully convergent distribution pattern with an intensity proportional to the number of individual LED modules 20. By generating a fully convergent distribution pattern, the fixture 100 enables a uniform illuminated area without lighting areas outside the intended area, which would result in inefficiencies.

Figure 3:
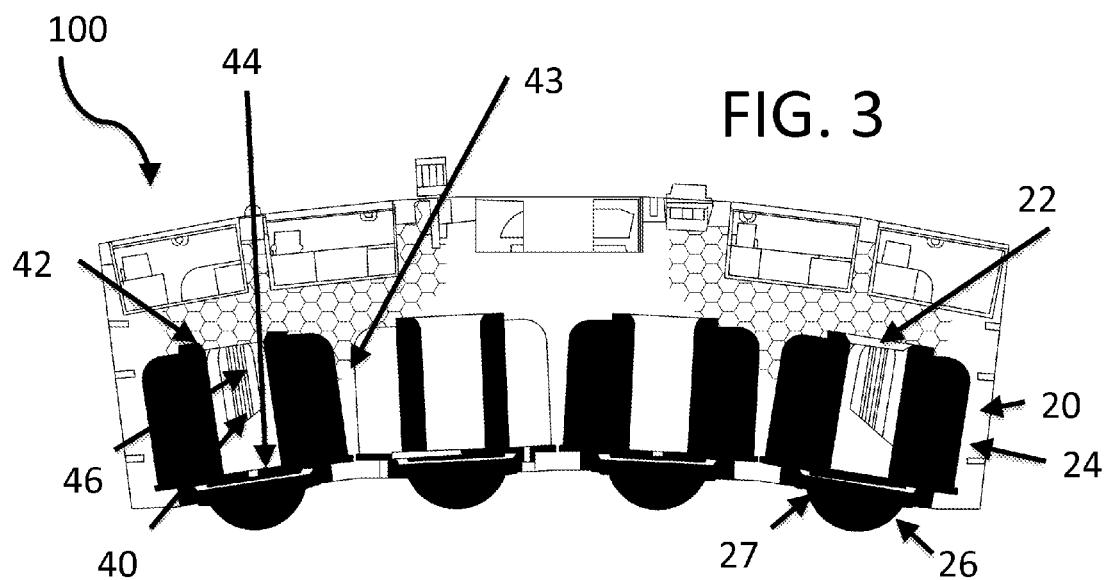
FIG. 3 shows a cross-sectional plan view taken at a plane 3-3 of the embodiment of the ark modular LED light fixture of FIG. 4.
Figure 4:
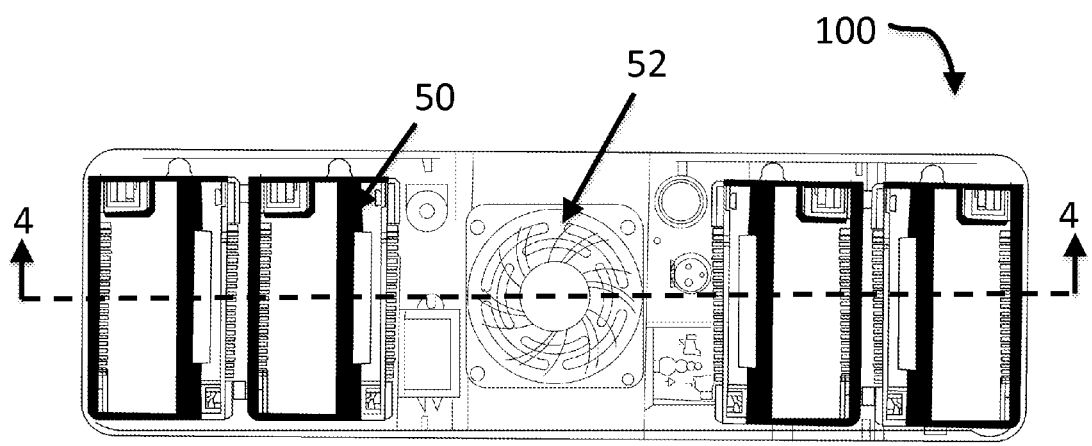
FIG. 4 shows a cross-sectional front view taken at plane 4-4 of the embodiment of the arc modular LED light fixture of FIG. 2.
Figure 5:
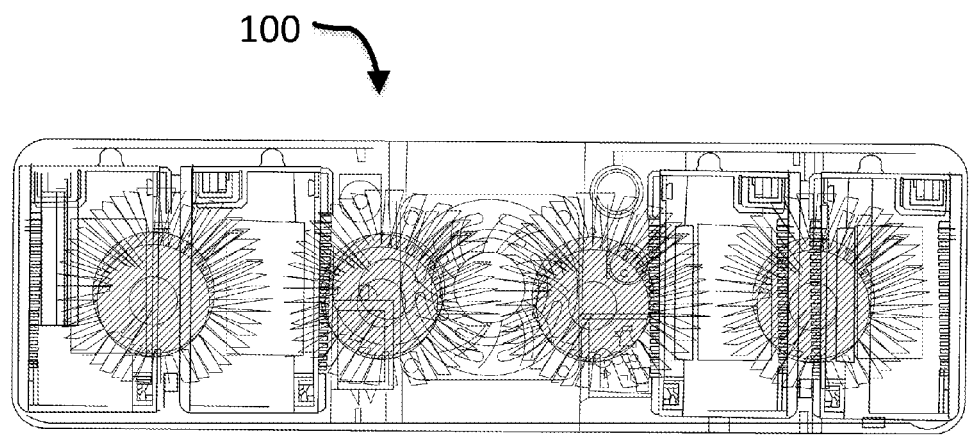
FIG. 5 shows a front wireframe view of an embodiment of an arc modular LED light fixture according to the present disclosure.

As shown in FIG. 3, each LED module 2—may include a heat sink 24 having an internal volume 4—defined by a closed end 42, a sidewall 43, and an open end 44. The heat sink 24 may further include a plurality of cooling fins 46 extending from the sidewall 43. In at least one embodiment, the internal volume 40 may be generally cylindrically shaped, and the cooling fins 46 may extend radially outward from the volume 40.

Each LED module 20 may further include an LED source 22 disposed within the internal volume 40 adjacent the closed end 42 of the heat sink 24. The LED source 22 may be a single light emitting diode or an array of multiple light emitting diodes depending upon the desired characteristics of the emitted light. As a non-limiting example, in at least one embodiment, the LED light source 22 may include at least three light-emitting diodes, at least one configured to emit red light at wavelengths between 610 and 760 nanometers (nm), at least one configured to emit orange light at wavelengths between 590 and 610 nm, and at least one configured to emit the blue light at wavelengths between 450 and 500 nm. In an alternative embodiment, the LED source 22 may include at least three light emitting diodes, at least one configured to emit red light at wavelengths between 610 and 760 nm, at least one configured to emit green light at wavelengths between 500 and 570 nm, and at least one configured to emit blue light at wavelengths between 450 and 500 nm. In yet another embodiment, the LED source 22 may include one light emitting diode configured to emit broad-spectrum white light.

The desired character of the light distribution produced by the fixture 100 may depend upon the intended use. For example, an aquarium flora grower may want a light distribution comprised mostly of broad-spectrum white light with some blue light and a very small amount of red light. Accordingly, different LED sources 22 may be selected for the LED modules 20 depending on the aesthetic or performance goals of the end user. Further, the power consumption of the LED source 22 may be selected to produce a pre-determined intensity of emitted light.

The LED source 22 may be positioned such that light emitted therefrom is emitted toward the open end 44 of the heat sink 24 where it falls incident upon a lens 26 disposed adjacent the open end 44. In at least one embodiment, the lens 26 may be a collimating lens that narrows the distribution of light emitted by the LED source 22 to align the emitted light rays in a more specific direction. Thus, the lens 26 enables the LED module 20 to emit a concentrated distribution of light aimed or directed toward an area about a central point 30 of the radius of curvature of the front panel 12. In at least one embodiment, the lens 26 may be a positive or converging lens that focuses the distribution of light emitted by the LED source 22 to direct the emitted light rays to a specific point. Further, the lens 26 may be selected to provide a desired concentration of the emitted light. For example, the lens 26 may be a 90° lens, which will result in an illuminated area approximately 36 inches (in.) in diameter at a distance of 18 in. from the fixture 100. Alternatively, the lens 26 may be a 60°, 45°, 15°, or any desired concentration angle selected to produce the desired illuminated area at a desired distance. Thus, the lens 26 enables the LED module 20 to emit the desired concentrated distribution of light aimed or directed toward the central point 30 of the radius of curvature of the front panel 12.

The LED module 20 may further include a color-mixing lens 27 disposed between the LED source 22 and the lens 26 to enable the LED module 20 to emit a uniform desired color of light. The lens 26 may be removably attached to the heat sink 24 using a retainer 28, which enables the substitution of different lenses 26 within a given fixture 100. In some embodiments, the lens 26 may enable color mixing such that a separate lens 27 is not needed.

By disposing multiple LED modules 20 along the arc of the front panel 12, the fixture 100 may generate a concentrated field of light around the center point 30. In at least one embodiment of the present disclosure as shown in FIGS. 2-5, the fixture 100 may include four LED modules 20, each positioned along the arc of the front panel 12 and aimed at the same center point 30. For example, the fixture 100 may be configured to produce an illuminated area 36 in. in diameter at a distance of 18 in. from the fixture 100.

Figure 6:
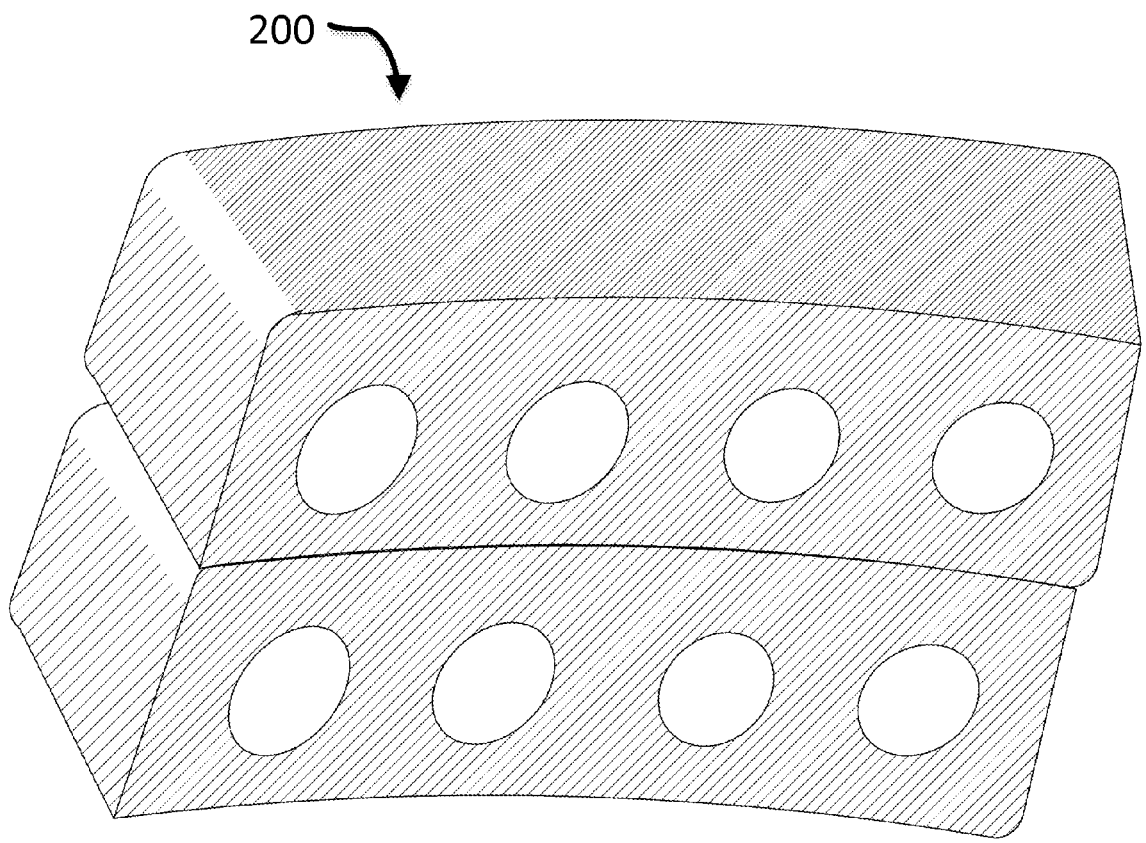
FIG. 6 shows an isometric view of an embodiment of an arc modular LED light fixture according to the present disclosure.
Figure 7:
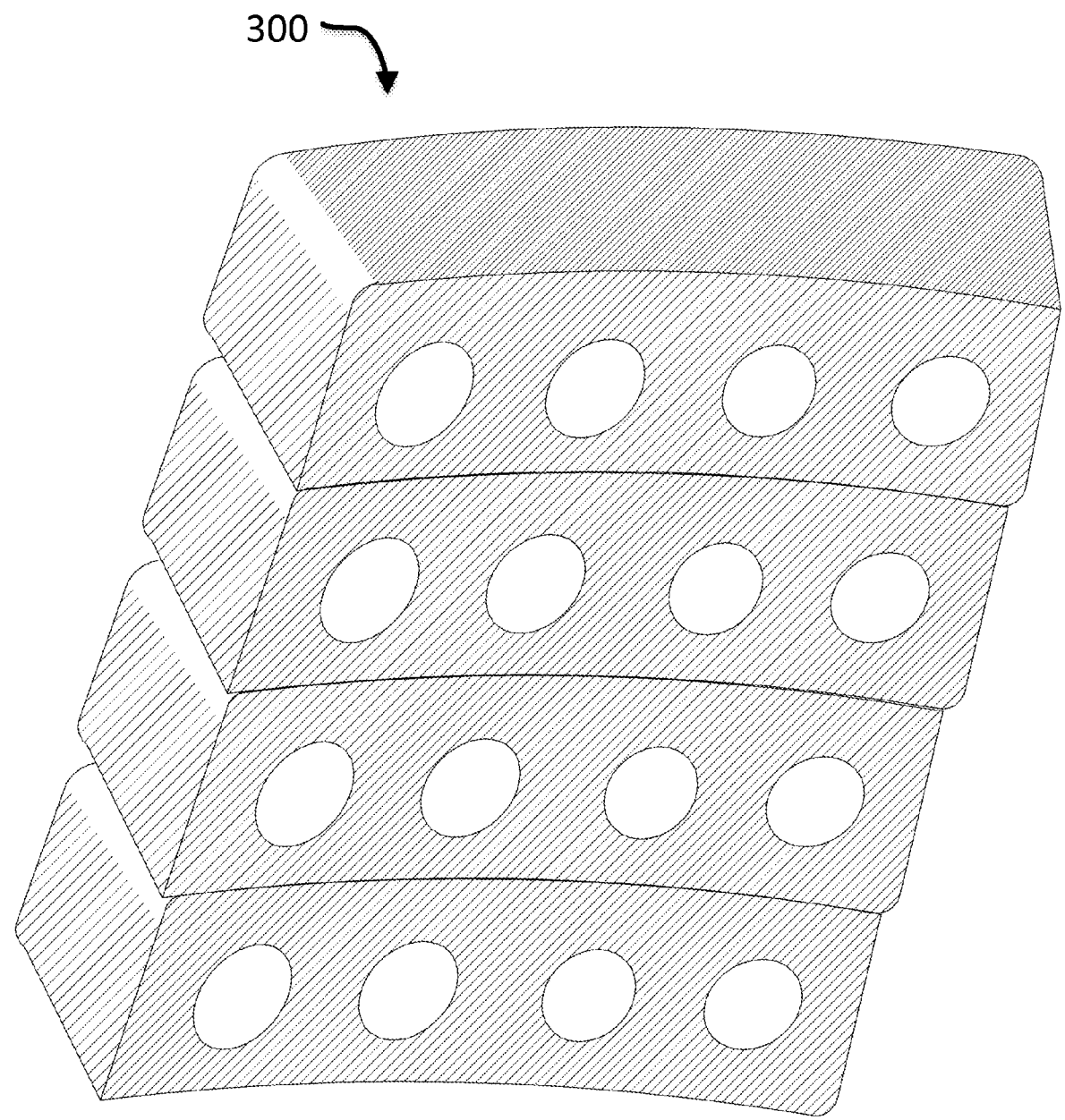
FIG. 7 shows an isometric view of an embodiment of an arc modular LED light fixture according to the present disclosure.

Multiple fixtures 100 may be combined to produce a wider and/or more intense illuminated area. As shown in FIG. 6, two fixtures 100 may be positioned adjacent one another to form the fixture 200, having two rows of LED modules 20 arranged along parallel arcs determined by the radius of curvature of the respective front panels 12 of the individual modular fixtures 100. In the fixture 200, the modular fixtures 100 may be arranged to converge their respective emitted light distribution patterns around the same center point 30, thereby generating a single, fully convergent distribution pattern of increased intensity. As shown in FIG. 7, multiple modular fixtures 100 may be positioned adjacent one another to form the fixture 300, having multiple rows of LED modules 20 arranged along parallel arcs to form an array of LED modules 20. Similar to the fixture 200, the modular fixtures 100 of the fixture 300 may be arranged to converge their respective emitted light distribution patterns around the same center point 30, thereby generating a single, fully convergent distribution pattern of increased intensity. Consequently, any number of modular fixtures 100 may be arranged to converge their respective emitted light distribution patterns around the same center point 30, thereby generating a single, fully convergent distribution pattern of increased intensity. Alternatively the modular fixtures 100 of the fixture 200 or the fixture 300 may be arranged to generate a wider resultant distribution pattern of substantially uniform intensity.

In the fixture 200 and the fixture 300, the modular fixtures 100 may be removably attached to one another by any suitable means. In at least one embodiment, the modular fixtures 100 may be attached to one another by magnets. Alternatively, the modular fixtures 100 may be attached to one another by fasteners, including but not limited to screws or clips. The means of attachment may further enable the modular fixtures 100 to be adjusted relative to one another such that the resultant distribution pattern may be adjusted. In at least one embodiment, the modular fixtures 100 may be attached to one another or removed from one another without having to open any part of the exterior body of the modular fixtures. In at least one embodiment, a dowel pin links the exterior body of a modular fixture with the exterior body of one or more other modular fixtures by weaving through a hole or plurality of holes through housing 10, enabling the modular fixtures to affix to each other.

The retainer 28 of the LED module 20 may be adjustable such that the angel of aim of an individual LED module 20 within the fixture 200 or the fixture 300 may be adjusted relative to the radius of curvature of the front panel 12 and to other LED modules 20 with the fixture 200, 300. Accordingly, the illuminated area produced by the fixture 200 or the fixture 300 may be adjusted—either narrowed or widened—as desired by adjusting the aim of individual LED modules 20 within a given fixture 200, 300. Alternatively, the means of attaching the modular fixtures 100 to one another within the fixture 200 or fixture 300 may be adjustable such that one fixture 100 may be aimed independent of an adjacent fixture 100, thereby either narrowing or widening the illuminated area produced by a given fixture 200, 300 as desired. The angle of aim of an individual LED module 20 may be adjusted by other adjusting means besides the retainer 28.

Referring now to FIG. 2, the fixture 100 may further include a cooling fan 52 and a fan driver disposed within the housing 10. In at least one embodiment, the cooling fan 52 is disposed adjacent the back panel 14 at or near a vent 18. The cooling fan 52 may increase the transfer of heat from the LED modules 20 by forcing ambient air across the heat sink 24, including cooling fins 44, by drawing ambient air into, through, and out of the housing 10 via the vents 18.

The fixture 100 may further include one or more controllers 50 disposed within the housing 10 to provide electrical power to the LED modules 20. In at least one embodiment, each controller 50 may be electrically connected to a corresponding LED module 20. Alternatively, one controller 50 may be electrically connected to a plurality or to all the LED modules 20 included in the fixture 100. The one or more controllers 50 may include control circuitry capable of power management functions for the LED modules 20, and, specifically, the LED source 22. The one or more controllers 50 may include constant current control circuitry that regulates the power provided to the LED source 22 at a prescribed current level, thereby protecting the LED source 22 from undesirable conditions, such as voltage spikes. The one or more controllers 50 may further include a power transformer to convert input alternating current to direct current suitable for the LED source 22. In at least one embodiment according to the present disclosure, the LED module 20 may include the controller 50, the cooling fan 52, the fan driver 54, and all necessary electrical connections. In such an embodiment, the housing 10 may include only the front panel 12, where the front panel 21 may include only a minimal structure necessary to support the plurality of LED modules 20. Such an embodiment may improve the transfer of heat from the heat sink 24 because the LED module 20 is not enclosed within side panels 16 and the back panel 14. In other embodiments, the housing 10 may fully enclose the LED module 20 in an airtight, watertight manner. The airtight, watertight enclosure in an embodiment is desirable especially in the specific context where watering of plants takes place in the vicinity of the embodiment of the invention.

Referring to FIG. 1, the fixture 100 may include a power connector 60 disposed through the housing 10 and electrically connected to the one or more controllers 50. The fixture 100 may include a power switch 62 disposed through the housing 10 and electrically connected between the power connector and the one or more controllers 50. The fixture 100 may further include a power interconnect 64 to enable a plurality of fixtures 100 to be electrically linked in parallel to form an array of fixtures 100, such as the fixture 200 and the fixture 300. The fixture 100 may include a dimmer 66 to enable adjustment of the electrical power supplied to the LED modules 20 and, thereby, adjust and vary the intensity of the light emitted by the fixture 100.

While various embodiments of an arc modular LED light fixture and methods for using and constructing the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of steps disclosed herein should not be construed as limitations of the present disclosure. In addition, disclosure directed to a method and/or process should not be limited to the performance of their steps in the order written. Such sequences may be varied and still remain within the scope of the present disclosure.

What is claimed is:

1. A modular lighting fixture, the fixture comprising:
   a housing comprising a front panel, the front panel having a radius of curvature;
   a plurality of light-emitting diode modules disposed adjacent to the front panel, each light-emitting diode module comprising:
     a heat sink;
     a light-emitting diode source mounted to the heat sink; and
     a lens disposed over the light-emitting diode source, the lens capable of refracting light emitted by the light-emitting diode source into a desired distribution pattern; and
     a dimmer switch configured to permit the user to adjust the intensity of light emitted from at least one light-emitting diode module;
   wherein the plurality of light-emitting diode modules produce a concentrated illuminated area at a pre-determined distance from the front panel as determined by the radius of curvature of the front panel; and
   wherein the fixture further comprises a means of adjusting an angle of aim of a specific light-emitting diode module relative to the front panel.

2. The fixture of claim 1, wherein the heat sink of each light-emitting diode module has an internal volume defined by a closed end, a sidewall, and an open end, and the light-emitting diode source is mounted within the volume and positioned to emit light toward the open end.

3. The fixture of claim 1, wherein the heat sink further comprises a plurality of cooling fins extending from the side wall.

4. The fixture of claim 1, wherein the light-emitting diode source of at least one of the plurality of light-emitting diode modules further comprises at least one light-emitting diode configured to emit red light, at least one light-emitting diode configured to emit orange light, and at least one light-emitting diode configured to emit blue light.

5. The fixture of claim 1, wherein the light-emitting diode source of at least one of the plurality of light-emitting diode modules further comprises at least one light-emitting diode configured to emit red light, at least one light-emitting diode configured to emit green light, and at least one light-emitting diode configured to emit blue light.

6. The fixture of claim 1, wherein the light-emitting diode source of at least one of the plurality of light-emitting diode modules further comprises at least one light-emitting diode configured to emit broad-spectrum white light.

7. The fixture of claim 1, wherein at least one of the plurality of light-emitting diode modules further comprises a color mixing lens disposed between the light-emitting diode source and a collimating lens of the fixture.

8. The fixture of claim 7, wherein the collimating lens further comprises a color-mixing lens.

9. The fixture of claim 1, wherein the lens is removably attached to the heat sink, so that different lenses may be substituted within the light-emitting diode module.

10. The fixture of claim 1, comprising four light-emitting diode modules.

11. The fixture of claim 1, further comprising at least one controller to regulate the voltage and current supplied to the light-emitting diode sources in the plurality of light-emitting diode modules.

12. The fixture of claim 11, wherein the at least one controller further comprises a controller incorporated in each light-emitting diode module.

13. The fixture of claim 1, further comprising at least one cooling fan positioned to force ambient air across the heat sinks of the plurality of light-emitting diode modules.

14. The fixture of claim 13, wherein the at least one cooling fan further comprises a cooling fan incorporated in each light-emitting diode module.

15. A lighting fixture, the fixture comprising:
   a plurality of modular units, each modular unit comprising:
     a front panel, the front panel having a radius of curvature; and
     a plurality of light-emitting diode modules disposed within the housing adjacent the front panel, each light-emitting diode module comprising:
       a heat sink;
       a light-emitting diode source mounted to the heat sink; and
       a lens disposed over the light-emitting diode source, the lens capable of refracting light emitted by the light-emitting diode source into a desired distribution pattern;
     wherein the plurality of light-emitting diode modules produce a concentrated illuminated area at a pre-determined distance from the front panel as determined by the radius of curvature of the front panel; and
   wherein the plurality of modular units are removably attached to one another to form an array of light-emitting diode modules; and
   further comprising a means of adjusting the position and attitude of one modular unit relative to another; and
   wherein at least one of the plurality of light-emitting diode modules further comprises a color mixing lens disposed between the light-emitting diode source and a collimating lens of the fixture.

16. A lighting fixture, the fixture comprising:
   a plurality of modular units, each modular unit comprising:
     a front panel, the front panel having a radius of curvature; and a plurality of light-emitting diode modules disposed within the housing adjacent the front panel, each light-emitting diode module comprising:
 a heat sink;
 a light-emitting diode source mounted to the heat sink; and
 a lens disposed over the light-emitting diode source, the lens capable of refracting light emitted by the light-emitting diode source into a desired distribution pattern;
 wherein the plurality of light-emitting diode modules produce a concentrated illuminated area at a predetermined distance from the front panel as determined by the radius of curvature of the front panel; and
wherein the plurality of modular units are removably attached to one another to form an array of light-emitting diode modules;
wherein all of the modular units are arranged to converge their respective emitted light distribution patterns around the same illuminated area; and
wherein each modular unit is enclosed within an airtight waterproof casing.

17. The fixture of claim 16, wherein each modular unit includes a hole for a pin to enable the plurality of modular units to be physically connected.

18. The fixture of claim 16, wherein each modular unit further comprises a power interconnect enabling the plurality of modular units to be electrically connected.

19. The fixture of claim 15, wherein each modular unit further comprises a power interconnect enabling the plurality of modular units to be electrically connected.

20. The fixture of claim 15, wherein each modular unit includes a hole for a pin to enable the plurality of modular units to be physically connected.

21. The fixture of claim 1, wherein each modular unit further comprises a power interconnect enabling the plurality of modular units to be electrically connected.

22. The fixture of claim 1, wherein each modular unit includes a hole for a pin to enable the plurality of modular units to be physically connected.

\* \* \* \* \*